United States Patent [19]

Endoh

[11] Patent Number: 5,008,934
[45] Date of Patent: Apr. 16, 1991

[54] CATV TRANSMISSION SYSTEM USING SCRAMBLED SIGNALS

[75] Inventor: Fumio Endoh, Tokyo, Japan

[73] Assignee: Pioneer Electronic Corporation, Tokyo, Japan

[21] Appl. No.: 363,658

[22] Filed: Jun. 8, 1989

[30] Foreign Application Priority Data

Oct. 18, 1988 [JP] Japan ................. 63-260596

[51] Int. Cl.⁵ .......................................... H04N 7/167
[52] U.S. Cl. ...................................... 380/15; 380/20; 358/86; 455/3
[58] Field of Search ............... 380/15, 20; 358/86; 455/1, 3, 603

[56] References Cited

U.S. PATENT DOCUMENTS

| | | | |
|---|---|---|---|
| 4,716,587 | 12/1987 | Fausone et al. | 380/10 |
| 4,769,838 | 9/1988 | Hasegawa | 380/20 X |
| 4,792,971 | 12/1988 | Uemura | 380/20 X |
| 4,794,643 | 12/1988 | Saeki et al. | 380/15 |
| 4,839,922 | 6/1989 | Imasaki et al. | 380/15 |
| 4,878,245 | 10/1989 | Bradley et al. | 380/10 |

Primary Examiner—Thomas H. Tarcza
Assistant Examiner—Linda J. Wallace
Attorney, Agent, or Firm—Sughrue, Mion, Zinn, Macpeak & Seas

[57] ABSTRACT

A CATV system includes a main head end as a system center and a plurality of subhead ends. A baseband TV signal is transmitted from the main head end to the subhead ends through optical fiber cables. A scrambling data generating means is disposed in the main head end to generate scrambling data and transmit those together with the TV signal. A scrambling means is disposed in each subhead end to perform a scrambling operation such that synchronization portions of a video signal is compressed on the basis of the scrambling data.

7 Claims, 4 Drawing Sheets

CATV TRANSMISSION SYSTEM USING SCRAMBLED SIGNALS

BACKGROUND OF THE INVENTION

The present invention generally relates to a CATV system including a scrambling operation which disables subscribers, other than specified subscribers, from receiving programs. More particularly, the present invention relates to a CATV system in which a main head end as a system center is connected to subhead ends respectively corresponding to a plurality of terminal unit groups through optical fiber cables which are used as telephone lines and have a narrow transmission band width.

In the CATV system, subscribers having contracts for receiving chargeable programs pay charges every program or every month. Therefore, it is necessary to take measures for disabling persons without contracts and persons trying to wiretap. As one of these measures, there is a method in which trap devices for preventing the passage of chargeable programs are disposed in lead-in wires to subscribers and the devices trap for contracted subscribers are removed so as to enable them to receive pay programs. However, in this method, chargeable programs are wiretapped relatively easily.

On the other hand, there is another method in which a certain signal processing technique known as "scrambling" is performed on the signal-transmitting side so as to make it impossible to receive chargeable programs by a general TV receiver. The demodulation of a scrambled signal is called "descrambling." In realizing the scrambling operation, it is necessary to perform, utilizing principles or natures of the TV receiver, the signal processing for preventing the signal reproduction, and further necessary to sufficiently consider preservation of image quality, secrecy, economical efficiency and reliability of terminal units, etc.

The most common scrambling method is the "gray-sync" type in which synchronization portions are suppressed to disturb the image. This type is generally classified into two systems an analog processing system and a digital processing system.

In the analog processing system, the signal level is continuously changed such that horizontal synchronization portions are compressed and signal portions are elongated. More specifically, the video signal is remodulated by a sine wave having such a phase relation that the horizontal synchronization portions are compressed. With this processing, not only the horizontal synchronization is disturbed, but also the color signals are affected so that color tones are considerably shifted. In this analog gray-sync processing system, the modulating and demodulating processings are made relatively simple, but the image is also deteriorated as it is processed.

In contrast to this, in the digital processing system, the signal portions are not processed at all and only the synchronization portions are compressed. The digital processing system includes a base band processing method and a high frequency processing method. Since the signal portions are not processed in this system, the image is theoretically not deteriorated. However, in the actual circuitry, influences of switching circuits appear in the demodulated image. An advantage of this system is that because there are a lot of digital circuit included, it is possible to integrate the circuits to a high degree, thereby reducing the cost of the terminal unit.

In a conventional CATV system as shown in FIG. 1, optical fiber cables 3 already being in use as telephone lines are employed as signal transmission lines from a main head end (MHE) 1 as a system center to subhead ends (SHE) $2_1$ to $2_3$ (which are called $2_n$ in the following description). This constitution reduces the number of repeaters which must be disposed on the signal transmission lines from the main head end 1 to many terminal unit groups $4_1$ to $4_3$ (which are called $4_n$ in the following description) far away from the main head end 1. In this system, coaxial cables 6 are used as signal transmission lines from each subhead end $2_n$ to many subscribers 5 in each terminal unit group $4_n$. However, since the transmission band width of the existing optical fiber cables 3 (telephone lines) is narrow, the TV signal must be transmitted in the form of a baseband signal.

In the case of the scrambling by the digital gray-sync processing system mentioned above, the scrambling operation is performed by suppressing the synchronization portions. Accordingly, when the scrambling operation is performed with respect to the baseband signal before being transmitted from the main head end 1, this baseband signal received in the subhead end $2n$ cannot be converted into a high frequency signal (RF signal having an IF frequency) since there are no synchronization signals included having sufficient amplitude in the baseband signal. Therefore, it is not appropriate to transmit from the main head end the baseband signal with the compressed synchronization portions.

Therefore, conventionally, in realizing the scrambling operation by the digital gray-sync processing system, an encoder for performing the scrambling operation is disposed in each of the subhead ends $2_n$ corresponding to the respective terminal unit groups $4_n$. After the scrambling operation is performed by the encoder, the TV signal is transmitted to the subscribers 5 through the coaxial cables 6.

FIG. 2 is a block diagram showing the construction of the main head end 1 and subhead end $2_n$ in the conventional CATV system mentioned above. The main head end 1 has a source 1a such as a video tape recorder and video disk player for generating the baseband TV signal to be transmitted, a computer 1b for producing various kinds of data to be transmitted together with the TV signal, and an electro-optical (E/O) converter 1c for converting the electric signal to an optical signal so as to be transmitted through the optical fiber cable 3.

The subhead end $2_n$ has an opto-electric (O/E) converter 2a for converting the optical signal transmitted through the optical fiber cable 3 to an electric signal, an amplifier 2b for amplifying the electric signal from the O/E converter 2a, and an E/O converter 2c for converting the electric signal amplified by the amplifier 2b into an optical signal and transmitting the optical signal to the optical fiber cable 3 disposed between the adjacent subhead ends $2_n$.

The subhead end $2_n$ also has a timing generator 2d as a scrambling data generation means for extracting a synchronization signal from the TV signal in the electric signal provided through the conversion in the above O/E converter 2a and generating scramble data on the basis of the extracted synchronization signal; a TV modulator 2e for modulating the baseband TV signal transmitted through the optical fiber cable 3 to produce an IF signal (RF signal) having an intermediate frequency; and a data modem 2f for demodulating the data generated by the computer 1b in the main head end 1 and transmitted together with the baseband TV signal, and modulating the demodulated data so as to be superimposed on the IF signal from the television modulator 2e. Furthermore, the subhead end $2_n$ has a scrambler 2g as a scramble means for performing the scrambling operation, and a TV up-converter 2h.

According to the above digital signal processing system the scrambler 2g scrambles the IF signal outputted from the television modulator 2e on the basis of the scrambling data generated by the timing generator 2d. The scrambled IF signal is up-converted by the TV up-converter 2h to a signal having a frequency of the second or third channel which is receivable by a TV receiver, and is transmitted to the coaxial cable 6 together with the data from the data modem 2f.

In such a conventional CATV system mentioned above, the entire encoder including the timing generator 2d for generating the scrambling data and the scrambler 2g is installed in each subhead end $2_n$ in a similar way. Accordingly, the number of encoders is the same as the number of subhead ends $2_n$, thereby resulting in a high cost of the entire CATV system.

SUMMARY OF THE INVENTION

Accordingly, an object of the present invention is to provide a CATV system in which it is not required to generate scramble data in each subhead end, thereby reducing the cost of the system.

With the above object in mind, the present invention resides in a CATV system in which a scrambling operation is performed by compressing synchronization portions of a video signal on the basis of scrambling data, and a main head end as a system center is connected to subhead ends respectively corresponding to a plurality of terminal unit groups through optical fiber cables having a narrow transmission band width to transmit a baseband TV signal. The CATV system comprises scrambling data generating means disposed in the main head end for generating the scrambling data for a scrambling operation and transmitting the generated scrambling data through the optical fiber cable, and scrambling means disposed in each of the plurality of subhead ends for performing the scrambling operation on the basis of the scrambling data transmitted through said optical fiber cable.

In the CATV system constructed above, since it is not necessary to dispose means for generating the scramble data in each subhead end, the cost of the entire system can be reduced and all the controls of the scrambling operation can be performed in the main head end.

BRIEF DESCRIPTION OF THE DRAWINGS

The present invention will be more apparent from the following description of the preferred embodiments thereof in conjunction with the accompanying drawings in which.

DESCRIPTION OF THE PREFERRED EMBODIMENTS

The preferred embodiments of a CATV system according to the present invention will now be described with reference to the accompanying drawings.

Figure 1:
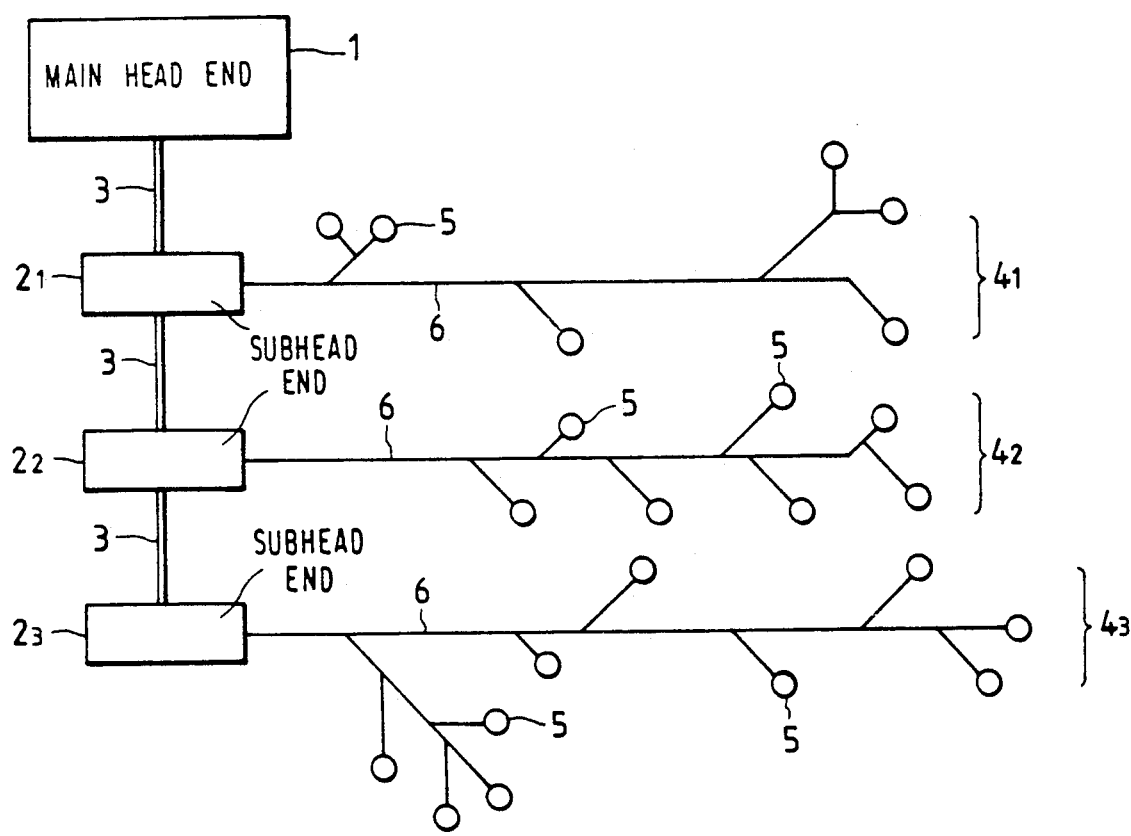
FIG. 1 is a block diagram showing the general construction of a CATV system.
Figure 2:
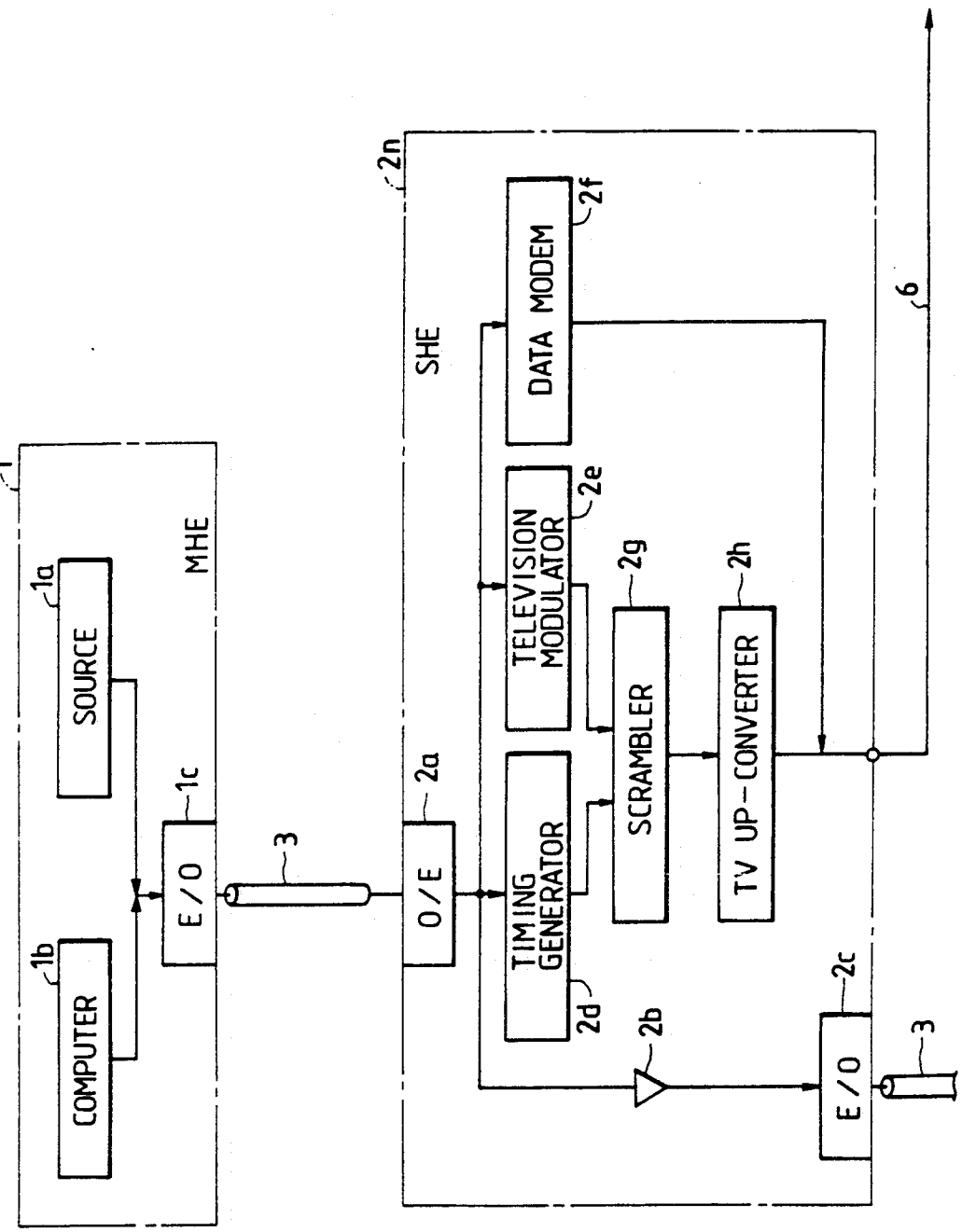
FIG. 2 is a block diagram showing one example of a conventional CATV system.
Figure 3:
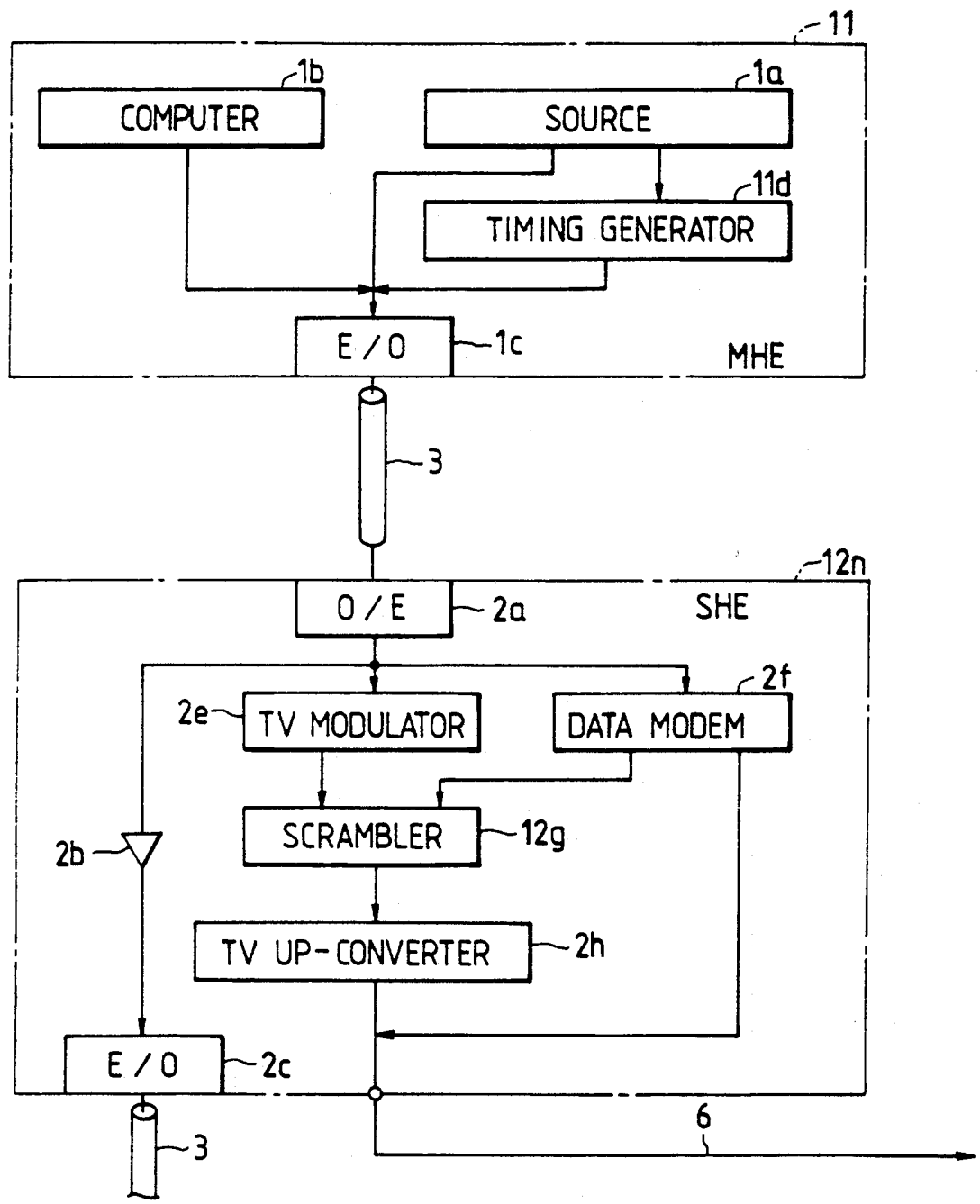
FIG. 3 is a block diagram showing one embodiment of a CATV system in accordance with the present invention.

FIG. 3 is a block diagram showing one embodiment of a CATV system in accordance with the present invention. In this FIGURE, constructional parts equal or corresponding to those in the conventional system of FIG. 2 are designated by the same reference numerals.

In FIG. 3, a timing generator 11d is disposed in a main head end 11 and corresponds to the timing generator 2d in the subhead end 2 of the conventional system shown in FIG. 2. The timing generator 11d counts the number of vertical synchronization pulses inputted from a source 1a, and generates scrambling data for designating a compression level of synchronization portions every predetermined count value. The scrambling data are inputted to an E/O converter 1c together with a TV signal from the source 1a and various kinds of data from a computer 1b, and are converted by the E/O converter 1c into an optical signal and transmitted to an optical fiber cable 3.

Similar to the above-mentioned conventional subhead end $2_n$ in FIG. 2, a subhead end $12_n$ has an optoelectric (O/E) converter 2a, amplifier 2b, E/O converter 2c, TV modulator 2e, data modem 2f, scrambler 12g and TV up-converter 2h, but it is not provided with the timing generator 2d in FIG. 2.

Accordingly, such scrambling data as would be generated by the timing generator 2d are not supplied to the scrambler 12g. Instead the scrambling data transmitted from the main head end 11 are demodulated by the data modem 2f and supplied to the scrambler 12g. The scrambler 12g performs the scrambling operation in accordance with the above-described digital gray-sync processing system with respect to an IF signal from the TV modulator 2e on the basis of the scramble data from the data modem 2f. The scrambled IF signal is up-converted by the TV up-converter 2h to a signal having a frequency (the second or third channel frequency) receivable by a TV receiver, and is transmitted to a coaxial cable 6 together with data from the data modem 2f.

Figure 4:
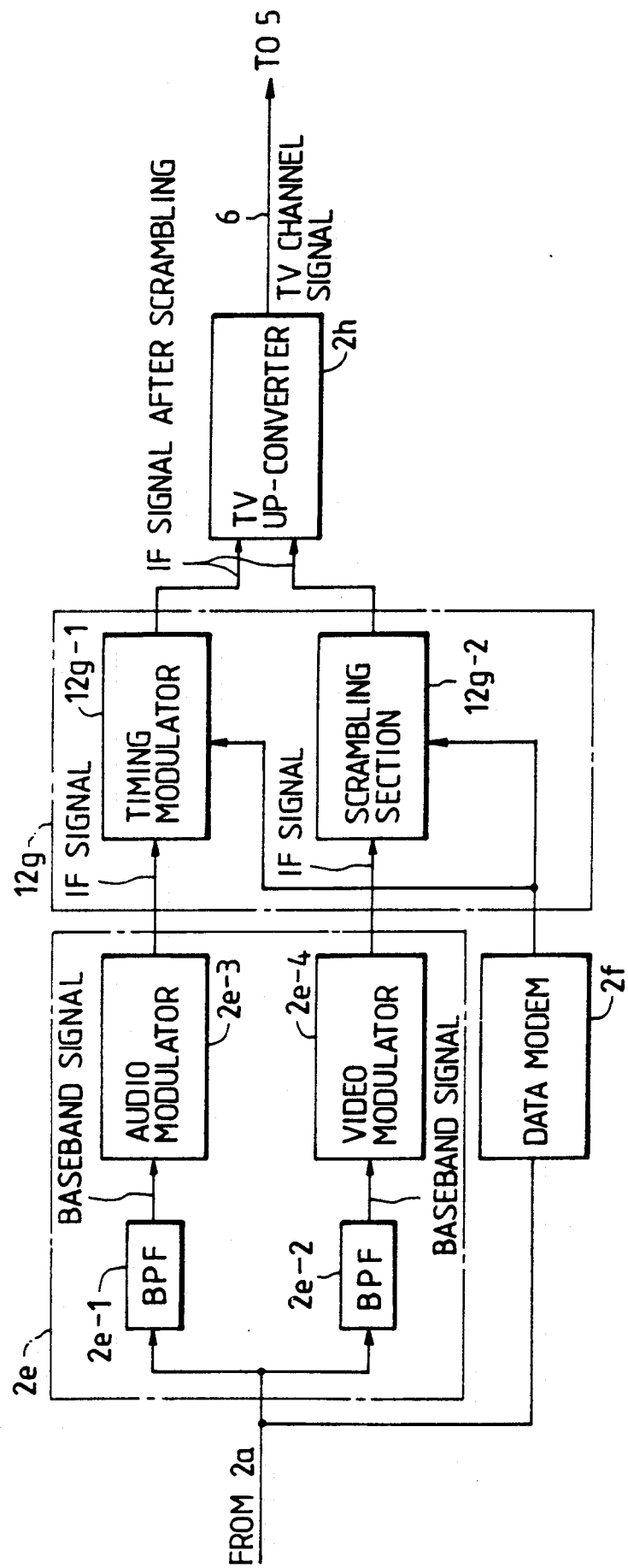
FIG. 4 a is block diagram showing the detailed construction of a part of the system of FIG. 3.

FIG. 4 is a block diagram showing the detailed construction of the above TV modulator 2e and scrambler 12g. The TV modulator 2e has band-pass filters (BPFs) 2e-1 and 2e-2 for respectively extracting an audio signal and a video signal in a baseband electric signal from the O/E converter 2a, an audio modulator 2e-3 for modulating the baseband audio signal from the BPF 2e-1 so as to be converted into an audio signal of an intermediate frequency (IF), and a video modulator 2e-4 for modulating the baseband video from the BPF 2e-2 so as to be converted into an IF video signal. The scrambler 12g has a timing modulator 12g-1 for amplitude-modulating the IF audio signal from the audio modulator 2e-3 by the scrambling data with a predetermined timing, and a scrambling section 12g-2 for scrambling synchronization portions of the IF video signal from the picture-image modulator 2e-4 on the basis of the scrambling data. The IF signal scrambled by the scrambler 12g is inputted to the TV up-converter 2h and is frequency-converted by this up-converter 2h to a signal having a specific channel frequency receivable by a TV receiver, and is finally transmitted to a subscriber 5 through the coaxial cable 6.

The scrambling data to be supplied to the timing modulator 12g-1 and scrambling section 12g-2 are obtained in the data modem 2f by demodulating the scramble data transmitted from the timing generator 11d of the main head end 11 and then modulating the resultant data.

The scrambling data incorporated into the audio signal by the amplitude-modulation are utilized when the scrambled video signal is descrambled in the terminal unit of each subscriber 5.

As mentioned above, in accordance with the present invention, the means for generating the scrambling data for the scrambling operation is disposed in the main head end. Accordingly, it is not necessary to dispose a means for generating the scramble data in each subhead end, so that the cost of the entire system can be reduced and all of the controls of the scrambling operation can be performed in one place, at the main head end.

What is claimed is:

1. In a CATV system in which a main head end as a system center is connected to a plurality of subhead ends corresponding to respective terminal unit groups through optical fiber cables each having a narrow transmission band, and a baseband TV signal is transmitted through said optical fiber cables, the improvement comprising:

scrambling data generating means disposed in said main head end, for generating scrambling data and supplying said scrambling data to said optical fiber cables; and scrambling means disposed in each of said plurality of subhead ends, for performing a scrambling operation such that synchronization portions of said baseband TV signal are compressed on the basis of said scrambling data transmitted through said optical fiber cables.

2. A CATV system as claimed in claim 1, wherein said scrambling data generating means comprises a timing generator for counting vertical synchronization pulses in a TV signal provided from a source apparatus and generating said scrambling data after every predetermined number of said vertical synchronization pulses.

3. A CATV system as claimed in claim 1, wherein said scrambling means comprises:

a TV modulator for extracting an audio signal and a video signal from said baseband TV signal and modulating said audio and video signal so that they are converted into an intermediate frequency audio signal and an intermediate frequency video signal, respectively; and a scrambling section for compressing synchronization portions of said intermediate frequency video signal from said TV modulator on the basis of said scrambling data.

4. A CATV system as claimed in claim 3, wherein said scrambling means further comprises a timing modulator for amplitude-modulating said intermediate frequency audio signal by said scrambling data.

5. A signal transmission method of a CATV system in which a main head end as a system center is connected to a plurality of subhead ends corresponding to respective terminal unit groups through optical fiber cables each having a narrow transmission band, comprising the steps of:

generating scrambling data in said main head end;

combining said scrambling data with a TV signal to produce a composite TV signal;

transmitting said composite TV signal to said subhead ends in the form of an optical signal through said optical fiber cables;

separating said scrambling data from said TV signal in said subhead ends;

modulating said TV signal to produce an intermediate frequency signal in said subhead ends;

performing a scrambling operation on said intermediate frequency signal in said subhead ends such that synchronization portions of said intermediate frequency signal are compressed on the basis of said scrambling data;

up-converting the thus scrambled intermediate frequency signal in said subhead ends; and transmitting the thus up-converted TV signal to a terminal unit.

6. A signal transmission method as claimed in claim 5, wherein said modulating step comprises the steps of:

dividing said TV signal into an audio signal component and a video signal component; and modulating separately said audio signal component and said video signal component to produce an intermediate frequency audio signal and an intermediate frequency video signal, respectively; and said method further comprising, after said performing-a-scrambling-operation step, the step of combining said intermediate frequency audio signal and said intermediate frequency video signal.

7. A signal transmission method of a CATV system in which a main head end as a system center is connected to a plurality of subhead ends corresponding to respective terminal unit groups including the steps of:

generating scrambling data in said main head end;

combining said scrambling data with a TV signal to produce a composite TV signal;

transmitting said composite TV signal to said subhead ends in the form of an optical signal;

separating said scrambling data from said TV signal in said subhead ends;

performing a scrambling operation on said TV signal in said subhead ends such that synchronization portions of said TV signal are compressed on the basis of said scrambling data.

* * * * *